United States Patent
Hart et al.

(10) Patent No.: US 10,295,417 B2
(45) Date of Patent: May 21, 2019

(54) LOAD CELL FOR MEASURING LOAD ON A ROD

(71) Applicant: Group Four Transducers Inc, E. Longmeadow, MA (US)

(72) Inventors: Matthew J. Hart, Wibraham, MA (US); Robert L. Gray, Weston, MA (US)

(73) Assignee: Group Four Transducers, Inc., East Longmeadow, MA (US)

( * ) Notice: Subject to any disclaimer, the term of this patent is extended or adjusted under 35 U.S.C. 154(b) by 45 days.

(21) Appl. No.: 14/490,064

(22) Filed: Sep. 18, 2014

(65) Prior Publication Data

US 2015/0075296 A1  Mar. 19, 2015

Related U.S. Application Data

(60) Provisional application No. 61/879,501, filed on Sep. 18, 2013.

(51) Int. Cl.
*G01L 1/22* (2006.01)
(52) U.S. Cl.
CPC ................... *G01L 1/2206* (2013.01)
(58) Field of Classification Search
CPC .... G01L 1/2206; G01L 1/2225; G01L 1/2218
USPC .................................................. 73/862.263
See application file for complete search history.

(56) References Cited

U.S. PATENT DOCUMENTS

| 3,004,231 | A | * | 10/1961 | Laimins | G01L 1/2218 338/5 |
| 3,343,409 | A | | 9/1967 | Gibbs | |
| 3,433,064 | A | | 3/1969 | Jacobson | |
| 4,065,962 | A | * | 1/1978 | Shoberg | G01G 3/1404 177/229 |
| 4,343,198 | A | * | 8/1982 | Jendrzejczyk | G01L 1/2206 73/170.15 |
| 4,543,837 | A | | 10/1985 | Stern et al. | |
| 4,932,253 | A | * | 6/1990 | McCoy | E21B 47/0006 73/152.61 |
| 5,499,542 | A | | 3/1996 | Morlan | |
| 2007/0186687 | A1 | * | 8/2007 | Haaser | G01L 5/0019 73/862.06 |
| 2011/0088489 | A1 | * | 4/2011 | Yamamoto | G01L 1/2218 73/862.627 |
| 2013/0174665 | A1 | | 7/2013 | Silva | |

* cited by examiner

*Primary Examiner* — Walter L Lindsay, Jr.
*Assistant Examiner* — Philip Marcus T Fadul
(74) *Attorney, Agent, or Firm* — Frost Brown Todd LLC (57) ABSTRACT

A load cell for measuring load in a rod, the load cell is described. The load cell is formed by a cylindrical strain member having a cylindrical aperture there through. The cylindrical aperture sized to fit the rod. The strain member includes a plurality of slots that create contact points there between for strain member to contact the rod in a predicable manner. A plurality of strain gages located adjacent to the contact points, the strain gages producing an electrical voltage proportional to the load on the rod.

20 Claims, 6 Drawing Sheets

LOAD CELL FOR MEASURING LOAD ON A ROD

CROSS REFERENCE TO RELATED INFORMATION

This application claims the benefit of U.S. Provisional Patent Application No. 61/879,501, filed Sep. 18, 2013, titled "Load Cell for Measuring Load on a Rod", the contents of which are hereby incorporated in its entirety.

TECHNICAL FIELD

The present disclosure is directed to load cells, and more particularly to load cells for measuring loads on rods.

BACKGROUND OF THE INVENTION

Before strain gage-based load cells became the method of choice for industrial weighing applications, mechanical lever scales were widely used. Mechanical scales can weigh everything from pills to railroad cars and can do so accurately and reliably if they are properly calibrated and maintained. The method of operation can involve either the use of a weight balancing mechanism or the detection of the force developed by mechanical levers. The earliest, pre-strain gage force sensors included hydraulic and pneumatic designs. In 1843, English physicist Sir Charles Wheatstone devised a bridge circuit that could measure electrical resistances. The Wheatstone bridge circuit is ideal for measuring the resistance changes that occur in strain gages. Although the first bonded resistance wire strain gage was developed in the 1940s, it was not until modern electronics caught up that the new technology became technically and economically feasible. Since that time, however, strain gages have proliferated both as mechanical scale components and in stand-alone load cells. Today, except for certain laboratories where precision mechanical balances are still used, strain gage load cells dominate the weighing industry. Pneumatic load cells are sometimes used where intrinsic safety and hygiene are desired, and hydraulic load cells are considered in remote locations, as they do not require a power supply. Strain gage load cells offer accuracies from within 0.03% to 0.25% full scale and are suitable for almost all industrial applications.

The strain gage based load cell is a transducer that is used to convert a force into an electrical signal. The conversion happens in two stages. First, through a mechanical arrangement, the force deforms a strain gage. The strain gage measures deformation as an electrical signal because the strain changes the effective electrical resistance of the wire. Most load cells consist of four strain gages in a Wheatstone bridge configuration. The electrical output of the transducer is proportional to the mechanical force being applied.

Traditional strain gages work best when the contact points between the strain gage and the load can be controlled, such as is the case with traditional scales. Using strain gages in other applications can be problematic when the way in which the load contacts the strain gage is variable or uncontrollable. This has been the case when using a strain gage to measure the load on a rod passing through the strain gage. Since the deformation of the rod cannot be controlled, the rod can engage the strain gage in unpredictable way leading to errors in the produced measurement. What is needed is a strain gage for measuring the load on a rod that controls the contact points with the rod to produce more accurate measurements.

BRIEF SUMMARY OF THE INVENTION

In a preferred embodiment a load cell for measuring load in a rod includes a cylindrical strain member having a cylindrical aperture there through sized to fit the rod. The strain member has a series of slots formed therein, the series of slots creating contact points for strain member in the areas between the slots allowing the strain member to contact the rod in a predicable manner. One or more strain gages located adjacent to the contact points produce an electrical voltage proportional to the load on the rod.

In another embodiment of the present invention, a load cell for measuring load in a rod includes a cylindrical strain member having a cylindrical aperture sized to fit the rod. The strain member is formed by a top portion, a bottom portion and a central body, with each of the top portion and bottom portion including a plurality of slots formed therein. The slots create contact points in the areas of the strain member between the slots in order to contact the rod in a predicable manner. A pair of strain gages located adjacent to the contact points, the strain gages producing an electrical voltage proportional to the load on the rod.

In yet another embodiment, a system for measuring load in a rod of a rod pumped oil and gas well includes a load cell formed by a cylindrical strain member having a cylindrical aperture there through, the cylindrical aperture sized to fit the rod. The strain member includes a top portion, a bottom portion and a central body, where each of the top portion and bottom portion include a plurality of slots. The slots create contact points there between for strain member to contact the rod in a predicable manner. A pair of strain gages located adjacent to the contact points, the strain gages producing an electrical voltage proportional to the load on the rod. A housing surrounds at least the central body of the strain member and a mounting system attaches the load to the rod, where the mounting system includes a top leveling plate and a lower leveling plate.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
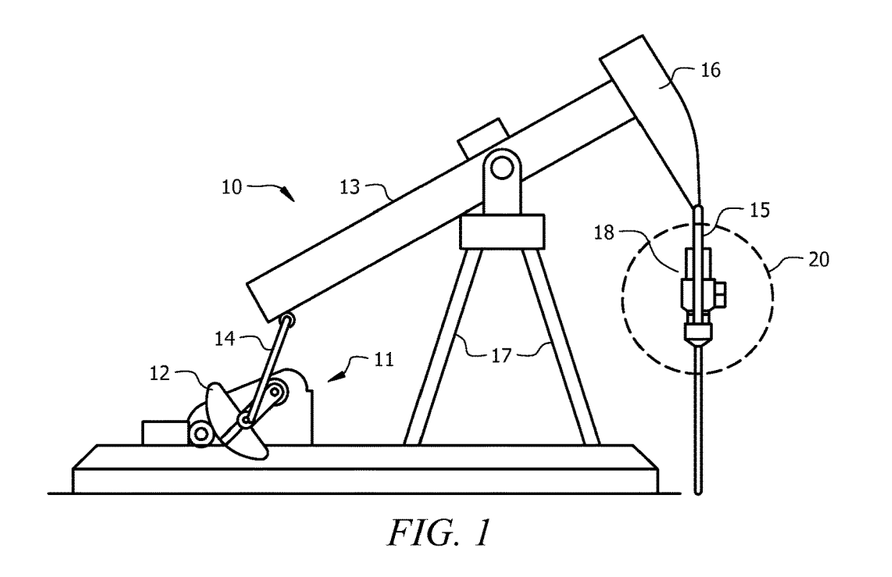
FIG. 1 is a side view of a rod pumped well utilizing a preferred embodiment of a strain gage load cell according to the concepts described herein.

Referring now to FIG. 1, a sucker rod pump 10 for an oil and gas well 10 is shown incorporating a strain gage load cell according to the concepts described herein. Pump assembly 10 includes a gear box 11 powered by a motor (not shown). The gearbox 11 is used to turn crank and counter weight 12. As crank 12 is connected to walking beam 13 via pitman arm 14, walking beam 13 pivots and submerges a plunger in a well bore using rod 15 connected to walking beam 13 by horse head 16. Walking beam 13 is supported by sampson posts 17.

Inside the well bore is a casing separating the well bore from the surrounding earth, and tubing extending inside the casing. Sucker rod 15 extends through the interior of the tubing to a plunger at the bottom of the well bore where perforations allow hydrocarbons and other material to enter an annulus between the casing and tubing. Liquid well products collect around a pump barrel, which contains a standing valve. During the down stroke of the plunger, a traveling valve in the plunger is opened and product in the pump barrel is forced into the interior of the tubing. When the pump begins its upstroke, the traveling valve is closed and the material in the tubing is forced up the tubing by the motion of the plunger. Also during the upstroke, the standing valve is opened and material flows from the annulus in the oil bearing region and into the pump barrel.

Using load and position measurement for the well rod, which measure the amount of force used in the pumping stroke allow for control of the well and for diagnostics when a problem is detected. Position can be modeled or determined in a variety of ways. A load cell, such as the load cell described herein, is used to provide the load information to the well controller.

Figure 2:
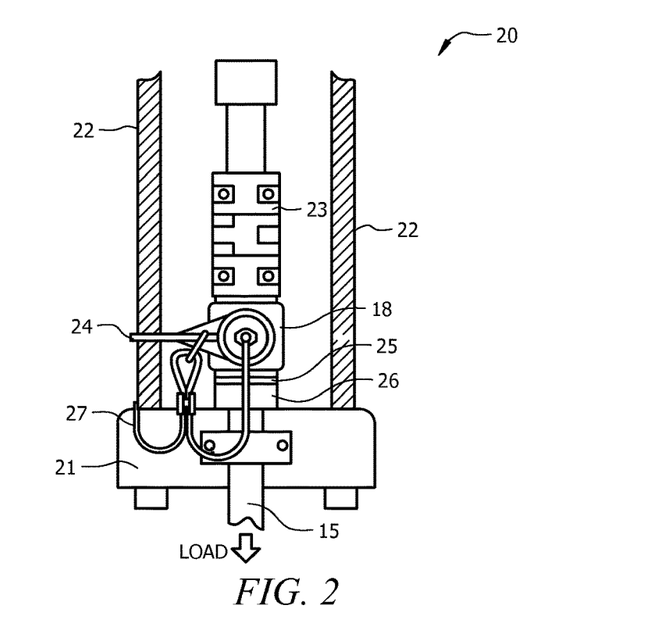
FIG. 2 is a detail view of a preferred embodiment of the strain gage load cell mounted to the rod of the rod pumped well from FIG. 1.

Referring now to FIG. 2, a detailed view of a preferred embodiment of a load cell mounted to a sucker rod is shown. Load cell mounting system 20 shows a preferred mechanism for mounting a load cell 18 to a rod 15 to allow for a measurement of the load on the rod. Cables 22 and carrier bar 21 connect rod 15 to the walking beam. Load cell 18 is held in place on rod 15 by rod clamp 23 on top and spherical washer 25 and bearing plate 26 on the bottom with rod 15 passing through load cell 18. Handle 24 attaches to cable 22 to prevent rotation of load cell 18 relative to rod 15. Wiring 27 carries the signals from load cell 18 to the well controller or other data collection device.

Strain-gage load cells convert the load acting on them into electrical signals. The strain gages themselves are attached, bonded, or otherwise connected onto a beam or structural member that deforms when weight is applied. In most cases, four strain gages are used to obtain maximum sensitivity and temperature compensation. Two of the gages are usually in tension, and two in compression, and are wired with compensation adjustments. When weight is applied, the strain changes the electrical resistance of the gages in proportion to the load. As strain gage load cells improve, use of other types load cells are diminishing.

Load cells consist of the following main components: (i) the spring element, or strain member, which converts the applied force or mass to a measurable strain; (ii) the strain gage, usually four, which converts the measured strain to a measurable voltage; (iii) temperature compensation components which reduce the effects of temperature on the load cell's zero and span; (iv) components for the reduction of adverse load effects; (v) printed circuit boards or flex circuits to mount all of the calibration and temperature compensation components and (vi) a cable to connect the load cell to junction boxes or display instrumentation.

Most applications for load cells have a straight forward mechanism for applying the load to the cell. Typical weight sensors have a plate or pad on which the item being weighed can be placed. As described, however, some applications, such as measuring the load on a rod, have more problematic circumstances for applying the load to the sensor. As described in FIG. 1, the pump jack uses the rod to operate a pump in the well, as a result the rod is continually place under tension and compression load as it moved through the pumping cycle. Control applications for the well require a measurement of the load being placed on the rod during the pumping cycle. This load is measured during the pumping stroke by the load cell.

Figure 3:
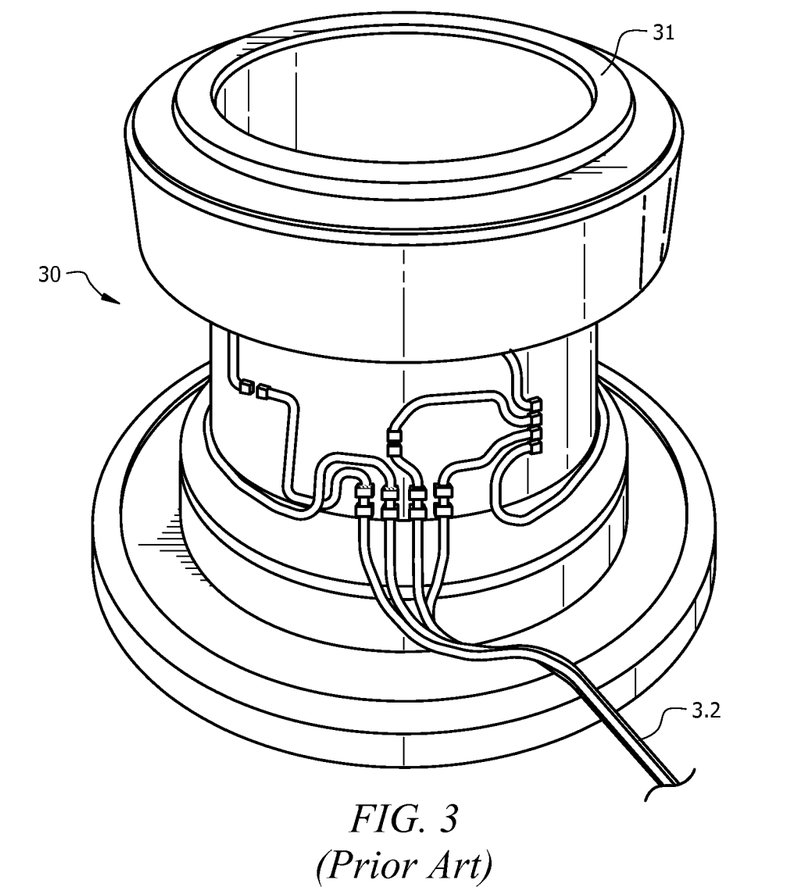
FIG. 3 is a perspective view of a prior art strain gage load cell.

A traditional prior art cylindrical column mounted load cell 30 is shown in FIG. 3. The load cell has a constant diameter cylindrical aperture 31 through which the rod passes. The deformation of the column in the cylindrical aperture places strain on the strain gage allowing the load cell to produce an electrical signal 32 in response to the load on the rod. The problem with the traditional load cell design in FIG. 3 is the loading of the cell is not consistent when the column is under strain. There is no way to control the points of contact on the load cell so the readings of the strain gages are inconsistent.

Figure 4:
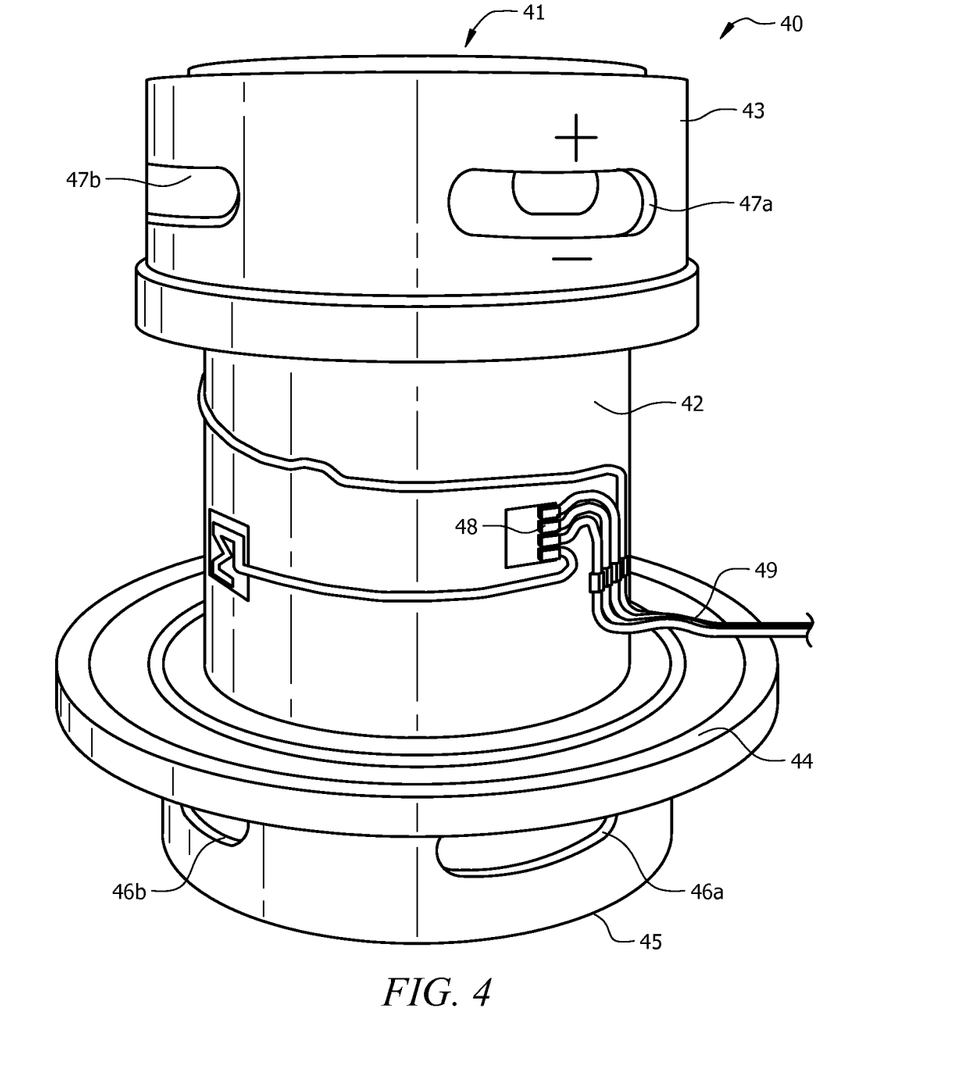
FIG. 4 is a perspective view of a preferred embodiment of a load cell according to the concepts described herein.
Figure 5:
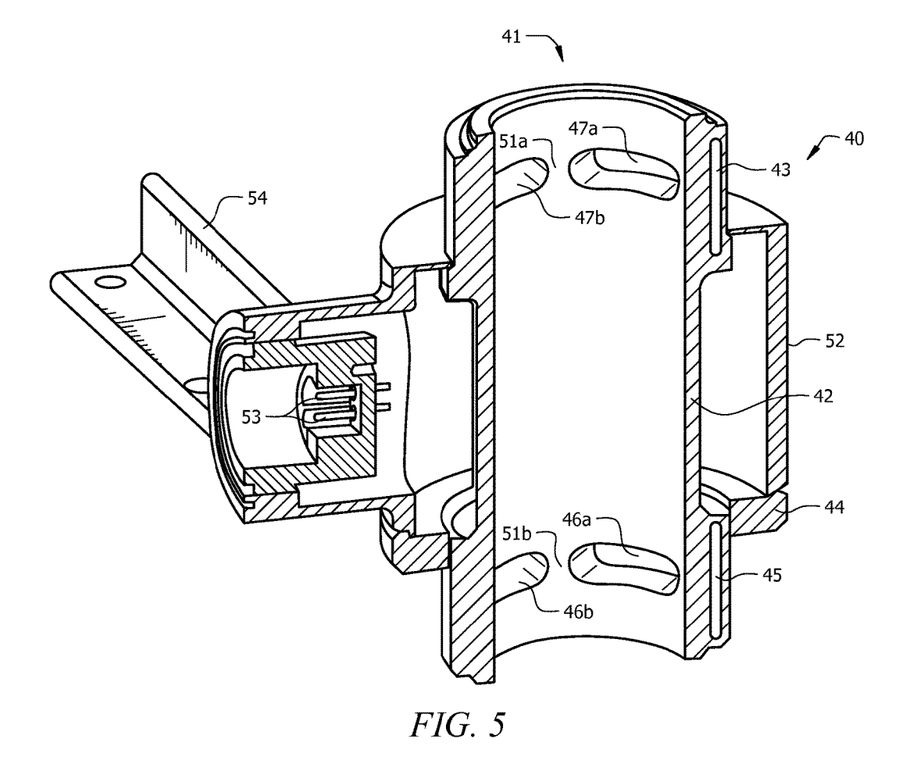
FIG. 5 is a cutaway view of a preferred embodiment of a load cell according to the concepts described herein with housing.

To improve the performance of the load cell the contact points between the rod and the load cell need to be consistent when the rod is under load. Controlling the contact points between the rod and the load cell allows more consistent and precise readings by the strain gages. A preferred embodiment of a load cell design that controls these contact points is shown in FIG. 4. The load cell 40 is formed by a strain member comprising upper portion 43 and lower portion 45 and central body 42 with a cylindrical aperture 41 passing through load cell 40, through which the rod passes. As shown in FIGS. 4 and 5, the strain member is formed as a single unitary piece. Flange 44 is used to help attach a mounting housing to load cell 40. Central body 48 includes electronics 48 which measure the change in resistance of load cell 40 under strain and create an output signal 49 proportional to the measured strain in the strain member. Upper portion 43 has a series of slots 47a, 47b, etc. therein, as does lower portion 45 with slots 46a, 46b, etc. Slots 46a, 46b, 47a, 47b, etc. are preferably the same size and evenly spaced around the lower portion 45 or upper portion 43, respectively. The slots create contact points, or bumps, at the load cell in the locations between the slots. These contact points extend the length of the load cell from the upper portion 43 to the lower portion 45. These "bumps" control the contact points between the rod and the load cell and force the strain in particular directions. A pair of strain gages are located on the central body under each contact point, with one strain gage measuring changes in length and the other measuring changes in diameter. In a preferred embodiment, there are four slots in each of the upper and lower portions of the load cell creating four contact points.

FIG. 5 shows a cut away view of the load cell 40 from FIG. 4. As described in FIG. 4, load cell 40 is formed by upper portion 43, lower portion 45 and central body 42. Cylindrical aperture 41 passes through the center of load cell 40 and is sized to match the diameter of the rod being monitored. Bumps 51*a* and 51*b* can be seen in between each of slots 47*a* and 47*b* and 46*a* and 46*b*, respectively. Flange 44 facilitates the connection of housing 52, which is used to protect the electronics and wiring of load cell 40. Connector 53 provides electrical connections with the load cell wiring and a wire strain harness 54 prevents the wires connecting to the load cell from becoming disconnected under strain.

Figure 6A:
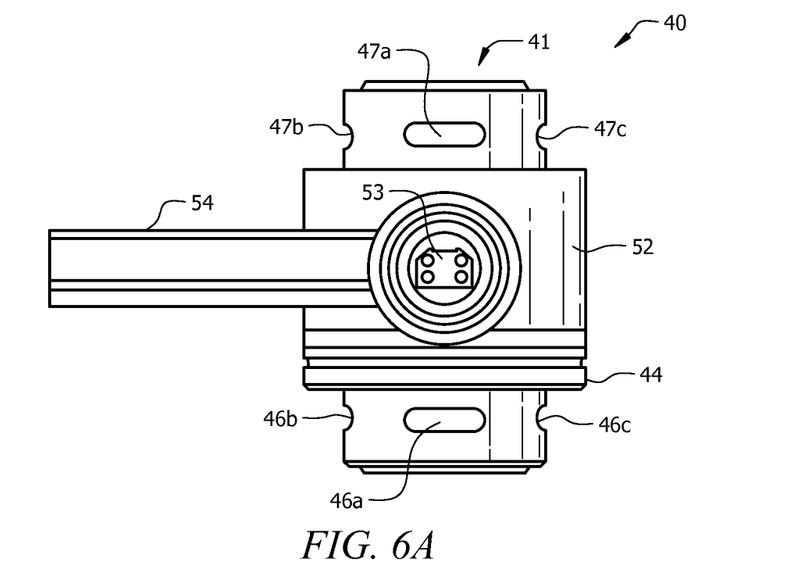
FIG. 6A is a side view of the load cell of FIG. 5.
Figure 6B:
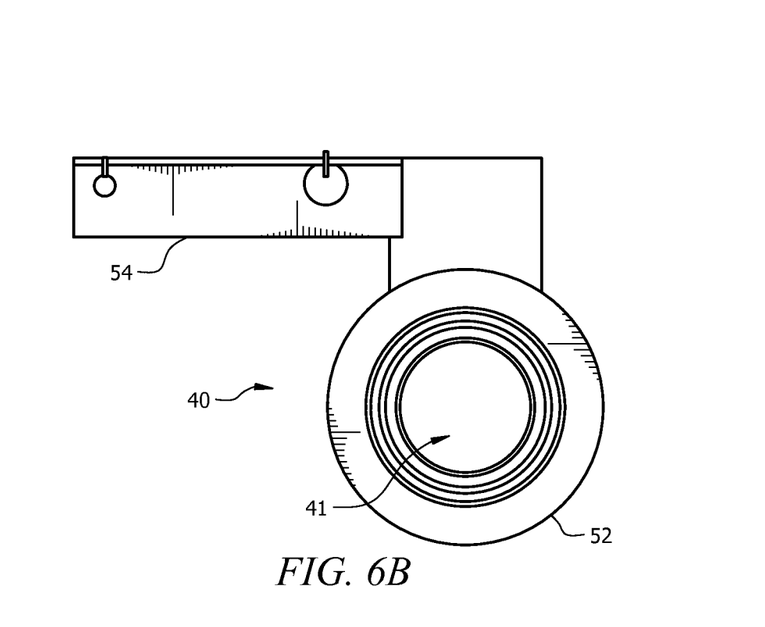
FIG. 6B is a top view of the load cell of FIG. 5.

FIGS. 6*a* and 6*b* show a side view and a top view, respectfully, of a preferred embodiment of load cell 40 from FIGS. 4 and 5. Reference is made to FIGS. 4 and 5 for the description of the features shown in FIGS. 6*a* and 6*b*.

Figure 7:
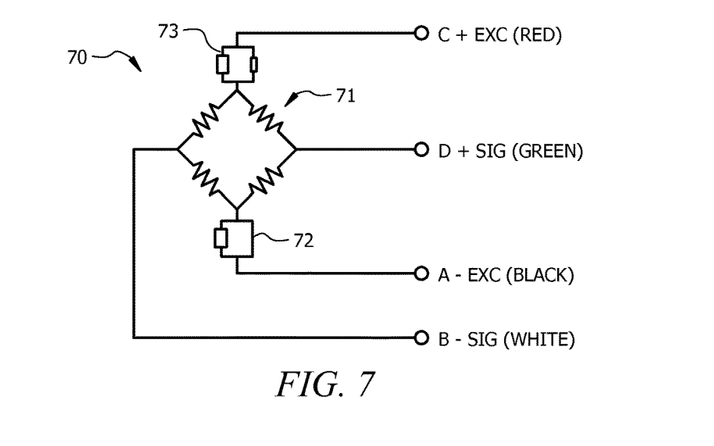
FIG. 7 is a circuit diagram of a preferred embodiment of a load cell according to the concepts described herein.

Referring now to FIG. 7, a preferred embodiment of an electrical diagram 70 for a load cell according to the concepts described herein is shown. The strain gages in the load cell are arranged as a Wheatstone bridge 71. Input voltages +EXC and −EXC are connected to the bridge 71 through temperature compensation components 72 and 73 that adjust the input voltage based on changes to the temperature of the load cell. Signals +SIG and −SIG are the output signals from the strain gages. The voltage of the output signal is proportional to the load on the rod.

Figure 8:
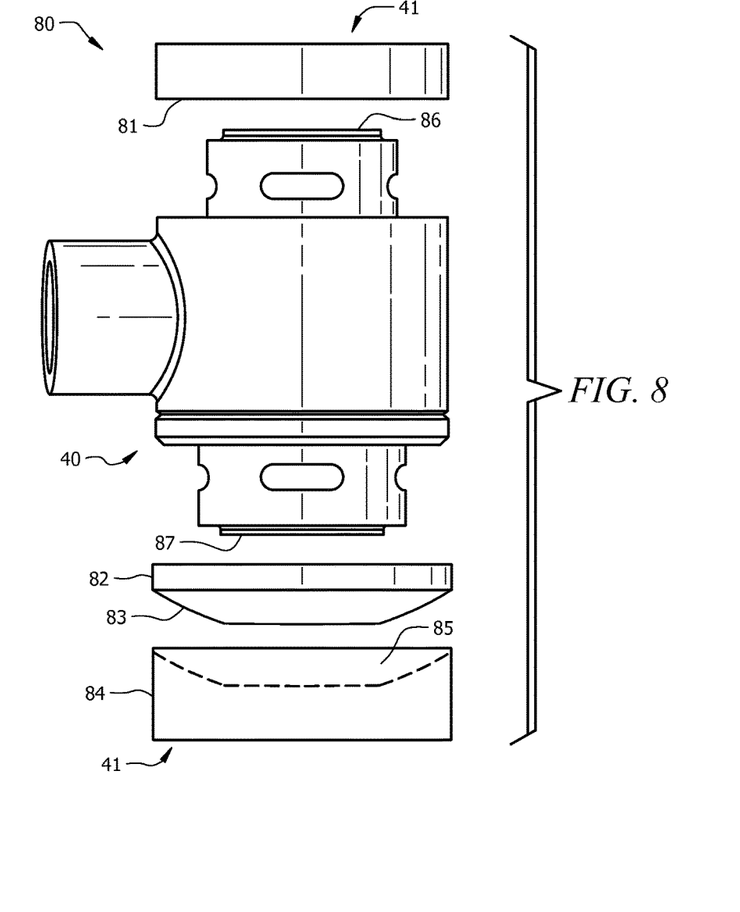
FIG. 8 is a side view of a preferred embodiment of a load cell and leveling plates according to the concepts described herein.

Referring now to FIG. 8, an alternate embodiment of a mounting system 80 for a load cell according to the concepts described herein is shown. Mounting system 80 is used to mount load cell 40 to the polished rod of a rod pumped well through aperture 41 which extends through the load cell and mounting system elements, and includes top leveling plate 81 that attaches to the top of load cell 40 using connector 86 which can be threaded or just mate to a groove in top plate 81. Mounting system 80 also includes male lower leveling plate 82 and female lower leveling plate 84. Male lower leveling plate 82 is attached to the load cell using connector 87 which can again be threaded or not. Male lower leveling plate 82 has convex portion 83 which mates to a concave portion 85 of female lower leveling plate 84. The mating of male lower leveling plate 82 and female lower leveling plate 84 allows the male lower leveling plate and female lower leveling plate to move relative to each other to align the load cell in the proper orientation though the action of the convex portion 83 slipping relative to the concave portion 85 to achieve proper alignment.

The load cell is preferably made from 17-4 high strength, transducer quality, stainless steel, though other types and qualities of steel and other materials can be used without departing from the scope of the invention. The strain gages are preferably glued to the load cell but can also be attached by other means. While two strain gages are described as being used for each contact point, more or fewer can also be used. In the preferred embodiment having four slots at each end, and four contact points, eight strain gages are used, though again, more or fewer can be used without departing from the scope of the invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A load cell for measuring load in a continuous rod, the load cell comprising:
   a single-piece cylindrical strain member having a cylindrical aperture of constant diameter there through, the cylindrical aperture sized to fit the continuous rod, the strain member including a plurality of slots, the slots extending completely through the strain member and creating contact points there between for strain member to contact the rod in a predictable manner; and
   a plurality of strain gages located on an outer surface of the strain member and adjacent to the contact points, the strain gages producing an electrical voltage proportional to the load on the rod.

2. The load cell of claim 1 wherein the slots are formed in a top portion and a bottom portion of the strain member.

3. The load cell of claim 1 wherein four slots form four contact points there between for the rod.

4. The load cell of claim 1 wherein two strain gages are located under each of the contact points.

5. The load cell of claim 4 wherein a first of the two strain gages measures changes in length of the rod and a second of the two strain gages measures changes in diameter of the rod.

6. The load cell of claim 1 further comprising a housing surrounding at least a portion of the strain member.

7. The load cell of claim 1 further comprising a mounting system for mounting the load cell to the rod.

8. The load cell of claim 7 wherein the mounting system comprises a top leveling plate and a lower male leveling plate and a lower female leveling plate, the lower male leveling plate including a convex portion and the lower female leveling plate including a concave portion fitting with the convex portion of the male lower leveling plate.

9. The load cell of claim 1 wherein the rod is a polished rod from a sucker rod pump for an oil and gas well.

10. The load cell of claim 1 wherein the strain gages include temperature compensation elements.

11. A load cell for measuring load in a rod, the load cell comprising:
   a single-piece cylindrical strain member having a cylindrical aperture there through, the cylindrical aperture sized to fit the rod, the strain member formed by a top portion, a bottom portion and a central body, wherein each of the top portion and bottom portion include a plurality of slots, the slots extending completely through the strain member and creating contact points in areas of the strain member between the adjacent slots such that the strain member contacts the rod in a predictable manner using the contact points; and a pair of strain gages located on an outer surface of the cylindrical strain member between the upper portion and lower portion and adjacent to the contact points, the strain gages producing an electrical voltage proportional to the load on the rod.

12. The load cell of claim 11 wherein the plurality of slots is four slots forming four contact points there between for the rod.

13. The load cell of claim 11 wherein a first of the pair strain gages measures changes in length of the rod and a second of the pair of strain gages measures changes in diameter of the rod.

14. The load cell of claim 11 further comprising a housing surrounding at least the central body of the strain member.

15. The load cell of claim 11 further comprising a mounting system for mounting the load cell to the rod.

16. The load cell of claim 15 wherein the mounting system comprises a top leveling plate and a lower male leveling plate and a lower female leveling plate, the lower male leveling plate including a convex portion and the lower female leveling plate including a concave portion fitting with the convex portion of the male lower leveling plate.

17. A system for measuring load in a rod of a rod pumped oil and gas well, the system comprising:

a load cell comprising:
　a unitary cylindrical strain member having a cylindrical aperture there through, the cylindrical aperture sized to fit the rod, the strain member formed by a top portion, a bottom portion and a central body, wherein each of the top portion and bottom portion include a plurality of slots, the slots extending completely through the strain member and creating contact points there between for strain member to contact the rod in a predictable manner; and
　a pair of strain gages located on an outer surface of the cylindrical strain member between the upper portion and lower portion and adjacent to the contact points, the strain gages producing an electrical voltage proportional to the load on the rod;

a housing surrounding at least the central body of the strain member; and a mounting system for mounting the load to the rod, the mounting system including a top leveling plate and a lower leveling plate.

18. The load cell of claim 17 wherein the lower leveling plate is formed by a lower male leveling plate and a lower female leveling plate, the lower male leveling plate including a convex portion and the lower female leveling plate including a concave portion fitting with the convex portion of the male lower leveling plate.

19. The load cell of claim 17 wherein the plurality of slots is four slots forming four contact points there between for the rod.

20. The load cell of claim 17 wherein a first of the pair strain gages measures changes in length of the rod and a second of the pair of strain gages measures changes in diameter of the rod.

* * * * *